(12) United States Patent
Yializis et al.

(10) Patent No.: US 8,586,173 B2
(45) Date of Patent: Nov. 19, 2013

(54) NANO-STRUCTURED DIELECTRIC COMPOSITE

(75) Inventors: Angelo Yializis, Tucson, AZ (US); Gordon Goodyear, Tucson, AZ (US)

(73) Assignee: Sigma Laboratories of Arizona, LLC, Tucson, AZ (US)

( * ) Notice: Subject to any disclaimer, the term of this patent is extended or adjusted under 35 U.S.C. 154(b) by 310 days.

(21) Appl. No.: 12/828,146

(22) Filed: Jun. 30, 2010

(65) Prior Publication Data

US 2012/0003449 A1 Jan. 5, 2012

(51) Int. Cl.
*B32B 5/16* (2006.01)
*B32B 7/02* (2006.01)

(52) U.S. Cl.
USPC .......................................... 428/213; 428/220

(58) Field of Classification Search
USPC ..................... 428/213; 427/79, 532, 535, 569
See application file for complete search history.

(56) References Cited

U.S. PATENT DOCUMENTS

| | | | |
|---|---|---|---|
| 6,638,621 B2 * | 10/2003 | Anderson | 428/402.24 |
| 6,762,237 B2 | 7/2004 | Glatkowski et al. | |
| 7,465,497 B2 | 12/2008 | Tan et al. | |
| 7,486,400 B2 | 2/2009 | Saito et al. | |
| 2005/0059760 A1 * | 3/2005 | Dellwo et al. | 524/409 |
| 2005/0249901 A1 * | 11/2005 | Yializis et al. | 428/35.7 |
| 2006/0292777 A1 * | 12/2006 | Dunbar | 438/197 |
| 2007/0117898 A1 | 5/2007 | Tan et al. | |

OTHER PUBLICATIONS

Te-Chuan Chen et al., Microwave Characterization of Nano-Structured Thin Film With Giant Dielectric Response, submitted for publication in 2010.
Jiongxin Lu et al., Recent Advances in High-K Nanocomposite Materials for Embedded Capacitor Applications, IEEE, Apr. 28, 2008.

* cited by examiner

*Primary Examiner* — David Sample
*Assistant Examiner* — Tahseen N Khan
(74) *Attorney, Agent, or Firm* — Yakov Sidorin; Quarles & Brady LLP; Antonio R. Durando (57) ABSTRACT

A multilayer dielectric structure is formed by vacuum depositing two-dimensional matrices of nanoparticles embedded in polymer dielectric layers that are thicker than the effective diameter of the nanoparticles, so as to produce a void-free, structured, three-dimensional lattice of nanoparticles in a polymeric dielectric material. As a result of the continuous, repeated, and controlled deposition process, each two-dimensional matrix of nanoparticles consists of a layer of uniformly distributed particles embedded in polymer and separated from adjacent matrix layers by continuous polymer dielectric layers, thus forming a precise three-dimensional nanoparticle matrix defined by the size and density of the nanoparticles in each matrix layer and by the thickness of the polymer layers between them. The resulting structured nanodielectric exhibits very high values of dielectric constant as well as high dielectric strength.

20 Claims, 6 Drawing Sheets

NANO-STRUCTURED DIELECTRIC COMPOSITE

BACKGROUND OF THE INVENTION

1. Field of the Invention

This invention is related in general to nano-dielectric materials with plasmon-resonance electric-field effects tailored to enhance optical and dielectric properties. In particular, the invention pertains to a multilayer composite wherein three dimensional matrices of uniformly distributed nanoparticles are embedded between alternating continuous polymeric dielectric films.

2. Description of the Related Art

Electric energy storage devices, photovoltaics, displays, biosensors and a multitude of photonic devices could benefit greatly from advanced nano-dielectric materials that are tunable for particular electronic and optical applications. In general, nano-dielectric materials are evaluated for different performance characteristics of interest in various segments of the electromagnetic spectrum. For example, at low frequencies (1 Hz-1 MHz), the insulation properties of the material are important as they relate to capacitor, cable, transformer and other such applications. At higher frequencies (GHz and THz), the dielectric constant, dissipation factor, leakage current, breakdown strength and surface flashover are of particular interest for microwave and pulse power applications. At infra red, visible and UV spectra, the optical properties of the material, such as transmission, absorption and refractive index, are used to characterize its properties.

The present invention is focused mainly on tunable nano-composite materials with improved energy storage and optical properties. With regard to capacitors, polymer dielectrics such as epoxies and other polymer chemistries have been mixed with both conductive and insulating nanoparticles to produce composites with high dielectric constant. A summary of such prior art is reported by Jiongxin Lu et al. in "Recent Advances in High-k Nanocomposite Materials for Embedded Capacitor Applications," IEEE Transactions on Dielectrics and Electrical Insulation, Vol. 15, No. 5, October 2008, pp. 1322-1328. Most such materials are formulated on the basis of percolation theory. That is, the nanoparticle filler is added to the polymer binder until the nanoparticles are virtually touching. At this stage of particle concentration, the dielectric constant of the composite becomes very high; however, the dissipation factor, the leakage current and the breakdown strength are compromised by the large clusters of agglomerated particles that short out segments of the dielectric. This renders the high k material virtually unusable for high voltage dielectric applications.

Similar composites have been made with other types of nanoparticles. For example, U.S. Pat. No. 6,762,237 describes a material where carbon nanotubes are mixed with a polymer dielectric to enhance the dielectric constant. Such nanocomposite materials, where the nanoparticles are randomly mixed to the percolation limit in a polymeric dielectric, end-up with higher dielectric constants but also with a dielectric strength that is significantly lower than that of the polymer dielectric alone with equal dielectric thickness. This can be useful, for instance, for capacitors used in low voltage applications. However, higher voltage applications (e.g., 100V-1000V or higher) require that a large number of capacitors be connected in a series configuration, which is not practical because the cumulative series resistance and losses become prohibitively high.

With regard to photonic applications, polymer nano-dielectric composites have been used for optical filters, photovoltaic cells, and various linear and non linear photonic devices. The literature describes composite materials that are either coated with conducting or semiconducting nanoparticles or contain nanoparticles in a host material, such as a liquid electrolyte or an insulating polymer dielectric. U.S. Pat. No. 7,486,400 (Saito) teaches a multilayer structure where conductive nanoparticle layers are stacked with alternating layers of dielectric $SiO_2$ particles. Saito teaches that the behavior of such a multilayer structure can be controlled advantageously by alternating metal nanoparticles with dielectric nanoparticles and by selecting the size, horizontal density and vertical distance between them to increase the plasmon resonance effect (as measured by the absorbance of the material). Such structure, where particles are stacked to form a nanocomposite, can take advantage of the plasmon resonance effects in the optical part of the electromagnetic spectrum, but it is not applicable to lower frequency dielectric applications because materials that have gas inclusions in them are not appropriate for high strength dielectrics for capacitor, cables and transformer applications.

This invention is directed at producing nano-dielectric materials that have a precise multilayer structure where the size of the metal, semiconducting or insulating nanoparticles and the distance between them are accurately controlled to produce a multilayer three-dimensional structure that has tens to thousands of two dimensional nanoparticle layers accurately spaced in a void-free polymer medium. Unlike other composite systems that are loaded with conductive nanoparticles to the percolation limit, the distance from one nanoparticle layer of the invention to the next is accurately controlled by the leveling effect and the thickness of the polymer film deposited between them. As a result, the dielectric constant as well as the breakdown strength of the multilayer structure of the invention can be controlled and tailored to obtain optimal specifications for different energy-storage applications. In addition, the material of the invention exhibits tunable electro-optical properties available for a variety of electrical and optical applications for which nano-structured dielectrics have been heretofore unsuitable.

BRIEF SUMMARY OF THE INVENTION

The invention is based on the concept of producing a nano-composite dielectric material by alternating vacuum-deposited layers of nanoparticles and polymer dielectric layers of a specific thickness, so as to produce a structured, three-dimensional lattice of nanoparticles in a void-free polymeric dielectric material. As a result of the continuous and repeated deposition process used to produce this structure, each layer of nanoparticles consists of a layer of uniformly distributed particles embedded in polymer and separated from adjacent nanoparticle layers by continuous polymeric dielectric films that act as spacer layers, thus forming a precise three-dimensional nanoparticle matrix defined by the nanoparticle size and density and by the thickness of the polymer film that separates the nanoparticle layers. Crucial to the invention is the fact that the dielectric material is deposited as a liquid monomer that first engulfs the nanoparticles to form a void-free nanoparticle layer and then forms the spacer film in liquid form, thereby providing a leveling effect on the surface receiving the subsequent deposition of nanoparticles.

According to one aspect of the invention, the dielectric constant of the composite material is increased by using conducting nanoparticles and tailoring the size of the nanoparticles and their density within each layer as needed for a particular application. As a result of the uniformly two-dimensional configuration of each nanoparticle layer and the separation provided between nanoparticle layers, the dielectric constant of the composite may be increased significantly while retaining voltage strength and the structure can be engineered predictably to exhibit characteristics of interest for a particular application.

Each layer of nanoparticles is completely encapsulated by the monomeric dielectric layer deposited over it and is separated from the underlying nanoparticle layer by the previously deposited liquid monomer film which, upon curing, produces a level polymeric dielectric film upon which the nanoparticle layer is deposited. The leveling effect of the dielectric layer ensures that each nanoparticle layer is formed over a level surface so that each layer encompassing nanoparticles has a thickness essentially equal to the effective diameter of the particles. Inasmuch as the dielectric strength of a material is known to increase in thinner films, according to another aspect of the invention, the multilayer structure is formed with many nanoparticle layers separated by very thin dielectric spacer films, with at least ten, but preferably one hundred or more nanoparticle-layer/polymer-film pairs per micron thickness of the multilayer composite. Uniformity of nanoparticle size and density and precise thickness control of the polymer layer are critical aspects of the invention. These parameters can be controlled only by depositing the nanoparticles and the dielectric monomer in vacuum using a high speed continuous process where the layers are deposited sequentially on a moving substrate, such as a rotating drum or a flat substrate moving in reciprocating or rotating motion in a single plane When conductive nanoparticles are used to enhance the dielectric constant via a plasmon resonance effect, the overall dielectric strength of the composite has been found to depend on the cumulative thickness of all the spacer polymer films. Thus, according to yet another aspect of the invention, the thickness of each dielectric layer and the size and density of the particles in each nanoparticle layer may be varied advantageously during deposition to achieve useful combinations of dielectric constant and strength desired for particular electrical and optical applications.

Various other purposes and advantages of the invention will become clear from its description in the specification that follows and from the novel features particularly pointed out in the appended claims. Therefore, the invention consists of the features hereinafter illustrated in the drawings, fully described in the detailed description of the preferred embodiments and particularly pointed out in the claims.

DETAILED DESCRIPTION OF THE PREFERRED EMBODIMENTS OF THE INVENTION

The heart of the invention lies in the idea of creating uniformly dispersed two-dimensional arrays of nanoparticles embedded in a void-free layer of dielectric material and assuring that the nanoparticle layers are separated from each other by a precisely controlled continuous spacer film of dielectric material. By producing such nanostructure in a continuous vapor deposition process, the three dimensional matrix of nanoparticles can encompass as many as one hundred or more of nanoparticle layers within one micron of thickness of the composite structure. The total thickness of the nanocomposite material depends on the application and can have as few as ten or as many as tens of thousands nanoparticle layers. By judiciously selecting the nanoparticle size and density and the separation between them, it is possible to increase the dielectric constant of the composite to very high values while also maintaining high breakdown strength. As a result, the nanocomposite dielectric of the invention is particularly suitable for high-voltage, high-power, capacitor applications.

Critical to the invention is flash-evaporation, a vacuum deposition process that enables the deposition of dielectric monomer in liquid form to fill the interparticle spaces and form a nanoparticle layer with no voids or gas inclusions. The further deposition of additional liquid dielectric material forms the spacer film between nanoparticle layers and produces a level surface that, upon curing, provides a substantially flat solid surface upon which the next nanoparticle layer can be deposited with uniform two-dimensional distribution. This can only be accomplished in a vacuum environment using a continuous monomer deposition and curing process that can coat conformally each array of deposited nanoparticles and then cover the layer with an additional film having a relatively level surface suitable for the deposition of the subsequent particle layer in a two-dimensional array configuration. The preferred process involves the deposition of a radiation curable monomer formulation in the form of a monomer vapor that condenses producing a thin liquid layer that first encapsulates the particles and then covers them by a predetermined thickness before it is converted into a polymer by a radiation source.

The process is conducted, for example, on a large drum rotating at high speed in a vacuum chamber, starting with the deposition and condensation of the monomer vapor into a thin liquid film, the polymerization of the liquid monomer by radiation cross linking, the deposition of nanoparticles, and then the repetition of these steps until a predetermined thickness of nanocomposite material is reached. Alternatively, the process may be initiated by the deposition of a nanoparticle layer over a substrate and then followed by the same subsequent steps. At a given drum speed, the thickness of the polymer layer is controlled by the amount of liquid monomer that is fed into the flash evaporation system where it is converted into a vapor that is guided onto the drum surface via a linear nozzle. The nanoparticle size and density are controlled by the evaporation rate of the material used to produce them and by the drum speed. The nanoparticles can be sputtered from one or more sputter targets, but evaporation from a thermal source or an electron beam is preferred because of the higher deposition rates afforded by these processes.

The term "density" with reference to the dispersion of nanoparticles in each layer to form a substantially two-dimensional array is intended to mean the number of particles per unit of surface of the layer. Referring to the arrangement of nanoparticles, the term "structured" is intended to mean a substantially uniform order in their space distribution, both in each array layer and in the space between arrays, as opposed to the randomly distributed arrangements obtained by processes other than flash evaporation (such as by mixing particles with a polymer binder). The term "continuous," as applied to the polymer layers, is intended to mean a film substantially without voids within it. The term "monomer" is intended to include also oligomers, as well as blends of monomers and oligomers, capable of controlled evaporation in a vacuum chamber. "Flash evaporation" is the process by which a monomer formulation is converted into a monomer vapor substantially instantly in vacuum. With reference to a film or layer of material, the term "level" is intended to mean that the film or layer has a smooth surface that conforms to the shape of the substrate over which the layer is deposited.

Flash evaporation is critical to the formation of uniform spacing between nanoparticle layers because conventional evaporation of a monomer from a heated source cannot be easily controlled as a function of time to produce a uniform source of monomer vapor. When, as is typically the case, the monomer formulations include monomers with different molecular weights, differential evaporation takes place and the composition of the resulting vapor varies with time, producing layers of non-uniform composition and structure, which in turn produces a layer with a surface that is not level and therefore is not suitable for building the dielectric structure of the invention. In the flash evaporation process, a controlled amount of formulated monomer liquid is pumped with a precision pump into an evaporator that is heated well above the evaporation temperature of the highest molecular weight component, thereby causing the entire monomer formulation to evaporate at the same time at a rate equal to the liquid feed rate, yielding a level film of uniform composition and structure.

Figure 1:
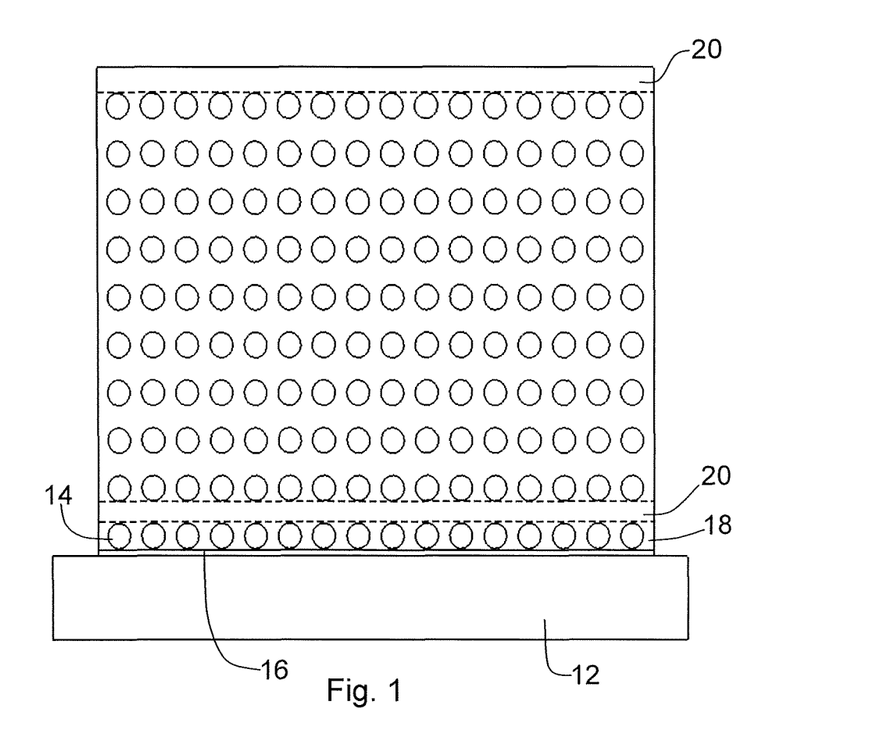
FIG. 1 illustrates schematically a cross-section of the three-dimensional nanocomposite structure of the invention, wherein alternating void-free layers of nanoparticles and polymer dielectric are deposited on a substrate. Each polymer layer encapsulates the last nanoparticle layer and then forms a leveling spacer film that defines the separation between successive nanoparticle layers.

Referring to the drawings, wherein like parts are labeled with like numerals or symbols, FIG. 1 illustrates a multilayer nanocomposite structure according to the invention. The multilayer structure 10 is built on a substrate 12, which, depending on the application, may be flexible such as a polymer film or foil, or rigid such as a glass slide or a silicon wafer. The substrate 12 may also be a support, such as a drum, from which the nanocomposite structure can be released after deposition and handled as a self-supporting material. As shown, the structure 10 includes a first layer of nanoparticles 14 (shown deposited over an initial layer 16 of release material, for example) covered by a first layer of polymer, where the polymer covers the nanoparticles to produce a void-free layer 18 and, in addition, creates a first level spacer film 20. Additional nanoparticle/polymer layers 18,20 are stacked as desired in a structure with a predetermined number of layers with characteristics tailored to a particular application.

Figure 2:
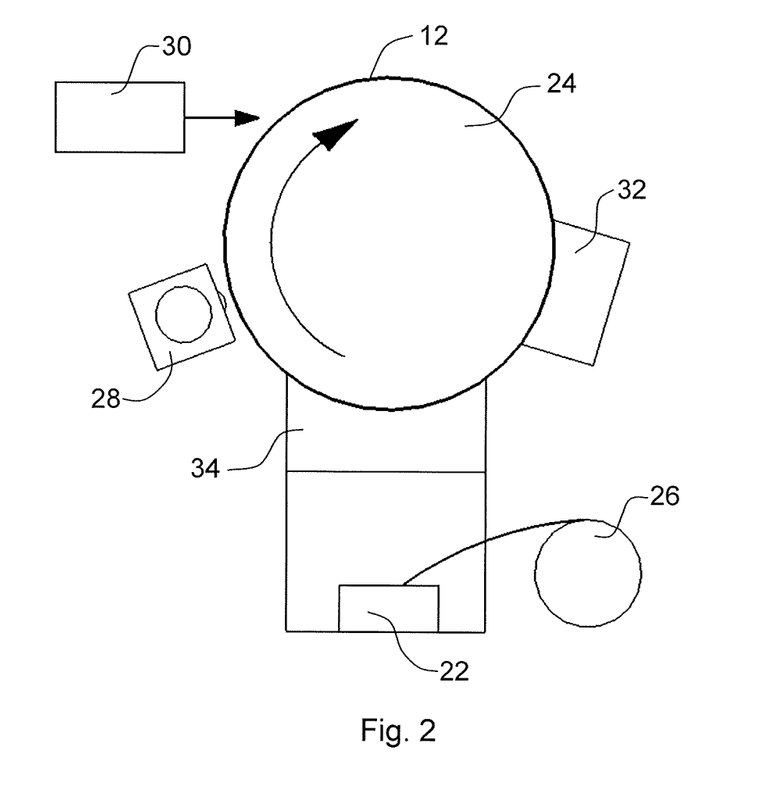
FIG. 2 is a schematic representation of a vacuum chamber adapted to deposit nanoparticle layers interleaved with void-free, continuous polymer dielectric films in a continuous process according to the invention.

FIG. 2 shows schematically the basic process equipment necessary to produce the nanocomposite structure 10 in a vacuum environment. A nanoparticle deposition unit 22 (a conventional thermal evaporation source) is used to deposit a uniformly dispersed array of nanoparticles by thermal evaporation in vacuum onto a substrate 12 that is fastened on a rotating drum 24 (a release layer 16 may be applied first, as illustrated in FIG. 1). In applications where the nanoparticles are composed of metals or metal oxides available in wire form, a wire feeder 26 is used to continuously supply material to the thermal evaporation source 22. As is well understood in the art (see U.S. Pat. Nos. 4,842,893 and 4,954,371, for example), a flash-evaporation unit 28 is then used to evaporate and deposit a formulated monomer (such as an acrylate based monomer, for instance) in vacuum onto the dispersed layer of nanoparticles 14 (see FIG. 1). The evaporated monomer condenses to form a liquid layer that occludes the nanoparticles, thereby producing the void-free layer 18 (FIG. 1), and then also producing the spacer film 20. The rate of monomer evaporation and the speed of the rotating drum 24 are controlled to produce the desired thickness for each polymeric layer.

A radiation-curing unit 30 (such as an electron-beam curtain, a UV-light, or a plasma device) is used to polymerize the condensed liquid monomer. A plasma device 32 can be used in some instances instead of the radiation-curing unit 30 to cure or to further functionalize the surface of the cured polymer layer before the next nanoparticle layer is deposited. Such functionalization step can influence the nucleation and growth rate of the nanoparticle layer. An additional plasma station 34 may be used with the appropriate plasma gas in conjunction with the thermal evaporation source 22 to reactively convert some metals, such as Zn, Al and Sn, to metal oxides or metal carbides. Sputtering or other deposition processes can also be used to deposit conducting nanoparticles. The vacuum chamber may be partitioned into separate sections to allow different pressures for different operation conditions.

According to the invention, the formation of the nanocomposite can start with the deposition of a first polymer layer on the substrate followed by a first nanoparticle layer, or a first nanoparticle layer followed by a first polymer layer. For applications where a thick self-supported nanocomposite dielectric is fabricated, the substrate may be the process drum with a thin release layer deposited over it to facilitate the removal of the nanocomposite. As the condensed liquid layer of monomer is deposited over each nanoparticle layer, the gaps between individual nanoparticles are filled with monomer to form a continuous, void-free, layer having a total thickness that is larger than the average nanoparticle diameter, thereby enclosing the nanoparticles to form a nanoparticle layer as well producing an additional spacer film of pure dielectric material. The thickness of this film is selected to produce the desired dielectric characteristics for a particular application. While it is understood that each monomer-deposition step in fact produces a single layer that incorporates the nanoparticles, the description of two distinct layers (one layer incorporating the nanoparticle layer and having a thickness defined by them; the other "spacer" layer being purely a dielectric polymer film with a thickness defined by the additional monomer deposited during the step) is adopted herein because it is found to be particularly useful to describe the invention and to distinguish it from the prior art.

Figure 3:
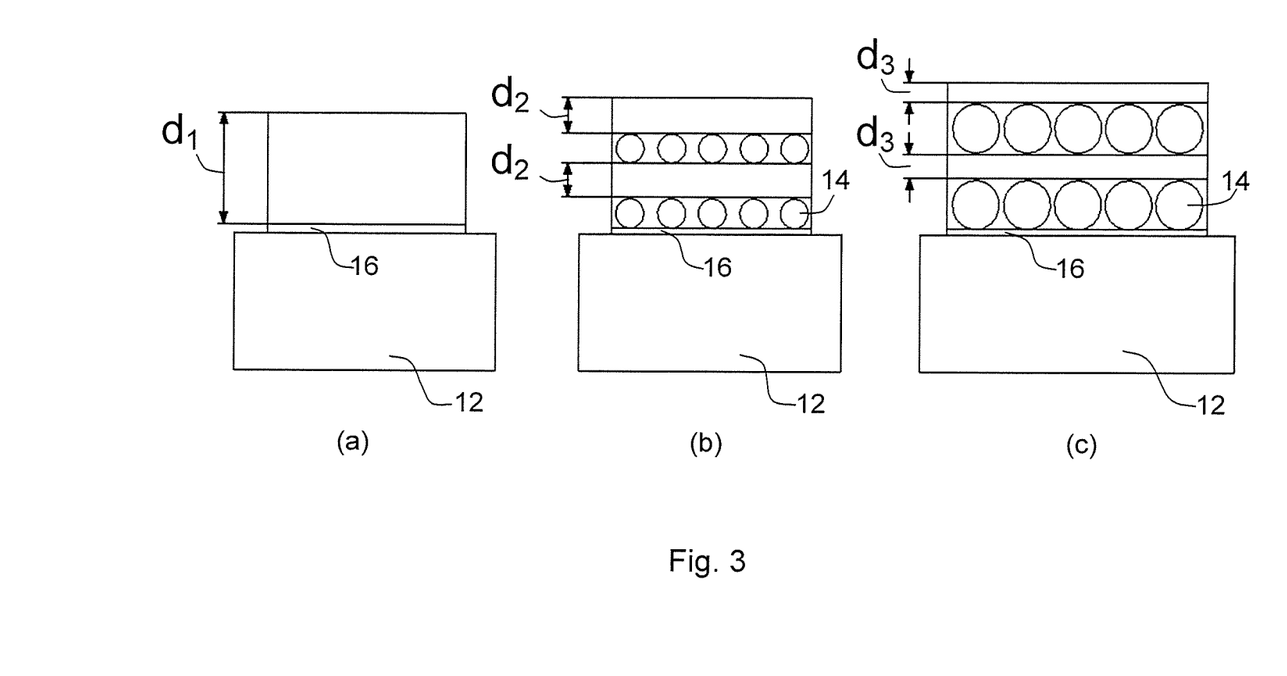
FIG. 3 shows schematically various configurations of composite structures to illustrate the use of the invention to manipulate the overall dielectric constant and breakdown strength of the composite.

The flexibility of design and the advantages afforded by the invention are illustrated with reference to FIG. 3. For example, FIG. 3($a$) shows two layers of dielectric polymer deposited in sequence over a release layer 16, thereby forming a composite layer with a total dielectric thickness $d_1$. FIG. 3($b$) shows the same two polymer layers deposited in sequence (that is, the same amount of polymer deposited in two passes) over two silver nanoparticle layers also deposited in sequence according to the invention. Clearly the overall thickness will be greater because of the volume occupied by the nanoparticles. Apart from the enhanced dielectric constant that results from the effect of the nanoparticles, the breakdown voltage of the composite will be dominated by the two spacer layers $d_2+d_2$, which have a total thickness that is lower than $d_1$. Similarly, as illustrated in FIG. 3($c$), larger silver nanoparticles will result in an effective spacer thickness $d_3+d_3$, where $2d_3<2d_2<2d_1$. Therefore, for a number n of polymer layers with no nanoparticles, the total polymer layer thickness D, which determines the breakdown strength of the dielectric, will be equal to $D=(n)(d)$, where d is the thickness of each spacer polymer layer.

Figure 4:
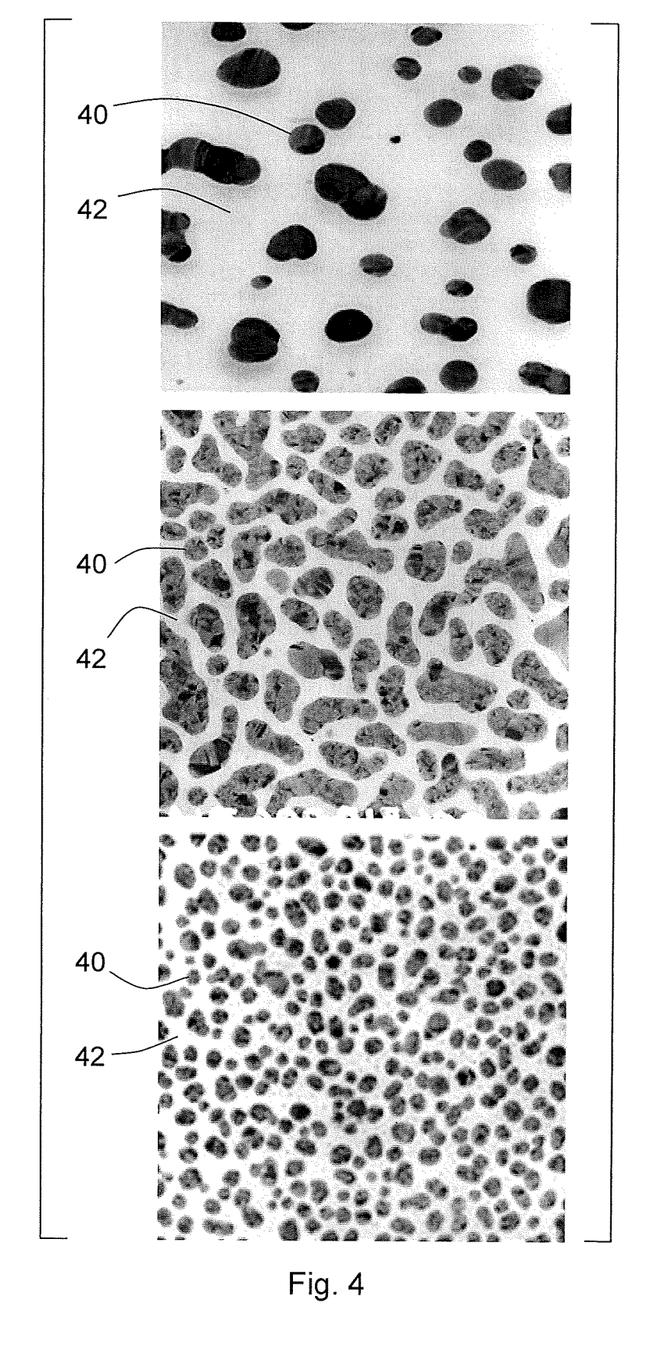
FIG. 4 shows TEM micrographs of three silver nanoparticle layers prior to the deposition of the encapsulating polymer material.

FIG. 4 illustrates the kind of substantially uniform two-dimensional dispersions of nanoparticles that can be achieved by vacuum depositing the material according to the invention. All three figures are TEM micrographs of silver nanoparticles 40 deposited over a dielectric film 42 of polyacrylate, with sizes in the 20-30 nm (above), 5-10 nm (middle) and 2-5 nm (below) ranges.

The following examples illustrate the invention. In each instance, the polymer layer deposition zone and the nanoparticle deposition zone were separate and masks with different apertures were used across the drum in order to deposit nanoparticles of different size at the same time. As a result, independently of each other, the polymer was deposited uniformly across the drum surface while the nanoparticles were deposited at different rates to produce parallel layers of variable size and density.

Example 1

A metallized polyester film substrate was mounted on a 13 inch wide, 40 inch diameter, rotating drum to allow for electrical measurements. The drum was rotated at a surface speed of 350 ft/min. The monomer vapor was deposited across the entire drum surface and set to produce polymer layers 21-nm thick (in the absence of particles). A silver vapor was produced by feeding two 1-mm diameter wires into two evaporation sources at a fixed rate of 10 ft/min each; the vapor was deposited over only about ⅔ of the drum surface through two different masks positioned adjacent to one another, which allowed the formation of a strip of polymer alone and of two different sizes of silver nanocrystals, one with an average diameter $S_1$ of about 1 nm and the other with an average diameter $S_2$ of 10 nm. A total number of drum revolutions n=120 produced 120 polymer layers; therefore, the portion of multilayer structure without nanoparticles had a total polymer thickness $D_p$=2520 nm. The portions including nanoparticles layers were correspondingly thicker in proportion to the volumes occupied by the nanoparticles.

The dielectric constant of the polymer alone was measured at $k_p$=5.5; the dielectric constant of the portion with the small nanoparticles was $k_{s1}$=12.1, and that of the larger particles was $k_{s2}$=88. The breakdown voltage of the polymer only material was measured at 495V, while the breakdown voltage of the two nanocomposites was 260V and 220V, respectively. This shows that while the dielectric constant of a nanocomposite can be increased by the inclusion of nanoparticles, as done in the prior art, the invention makes it possible to structure the nanocomposite so as to retain a sufficiently high breakthrough voltage to provide heretofore unattained results (i.e., a high enough breakthrough voltage to permit high-voltage applications).

Considering capacitor applications, for example, the capacitive energy density E stored in a dielectric is given by the equation $E=\frac{1}{2}CV^2$, where C is capacitance and V is the voltage applied to the capacitor. Capacitance and dielectric constant are linearly related. Therefore, the energy stored in a dielectric can be maintained so long as changes in the dielectric constant are roughly balanced by the square of opposite changes in the voltage. That is, if the dielectric constant of a nano-structured composite can be increased and its breakthrough voltage maintained at a high enough level such that the $CV^2$ product per unit of capacitor area is increased, the energy storage capability of the material is increased. With the materials of Example 1, for instance, the energy $E_p$ stored in a capacitor area with capacity C=1 F was 122.5 KJ in the case of the polymer only; it was $E_{s1}$=74.4 KJ=$0.61E_p$ for the smaller nanoparticle composite; and $E_{s2}$=397.2 KJ=$3.24E_p$ for the larger nanoparticles composite. This illustrates how the size of the particles and the thickness of the spacer layers can be manipulated according to the invention to produce a nanostructure with considerably higher energy capacity by increasing the dielectric constant while maintaining a relatively high breakthrough voltage, an advantage not yet achieved in the prior at.

Example 2

The same rotating drum of Example 1 was coated with a release layer and rotated at a surface speed of 500 ft/min. The monomer vapor was deposited across the entire drum surface to produce polymer layers 20-nm thick (in the absence of particles). The width of the drum was partitioned and masked so as to produce four strips of multilayer composite: one with no nanoparticles and three with three different sizes of nanoparticles. Accordingly, the silver vapor, produced as in Example 1, was deposited over only about ¾ of the drum surface to produce a strip with nanoparticles with effective diameters of about 1 nm, 5 nm and 10 nm. A total number of 10,000 drum revolutions were performed to produce a 10,000-layer nanocomposite materials that was separated and lifted off the drum as a self-supported dielectric.

Figure 5:
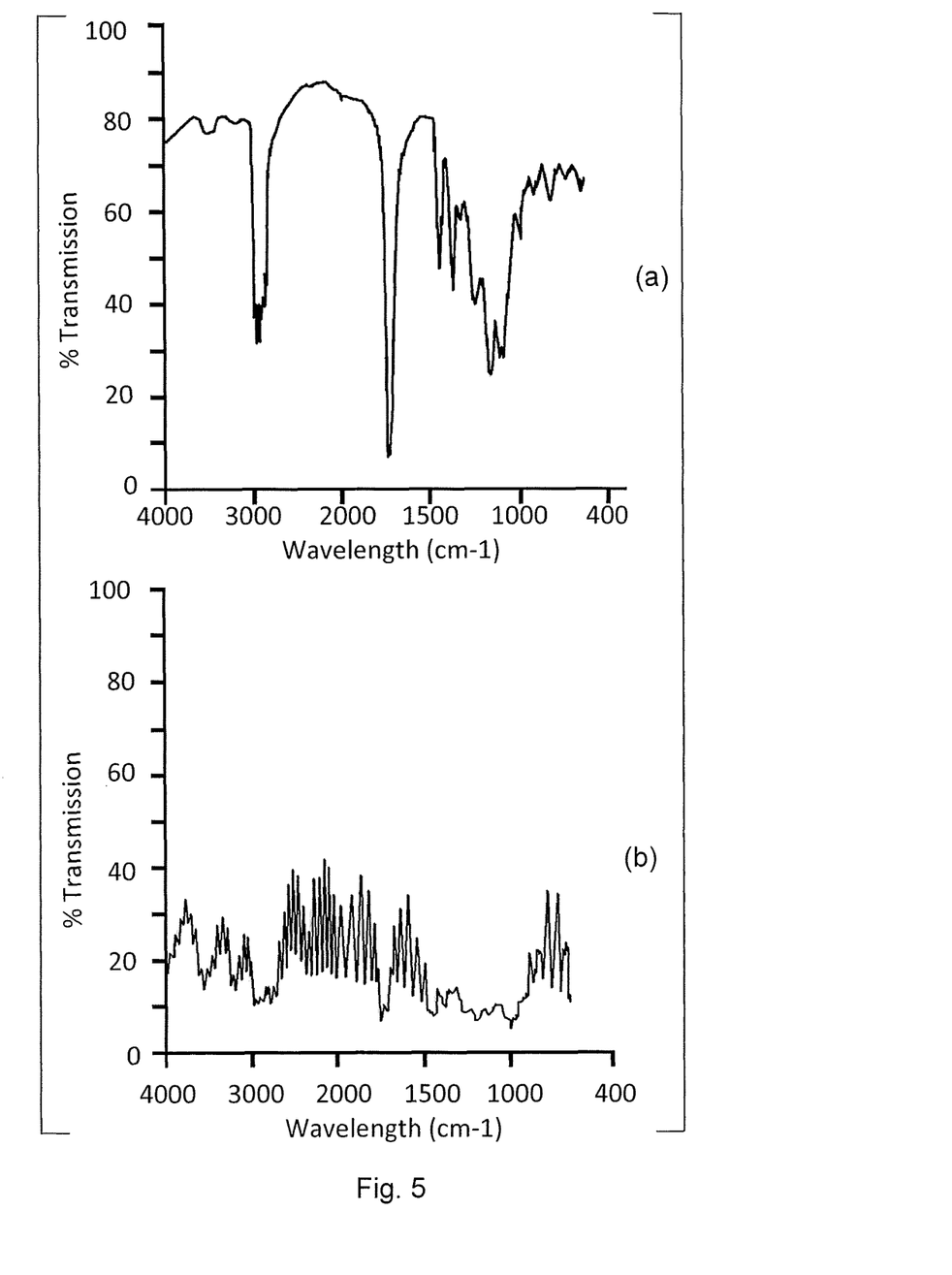
FIG. 5 illustrates the spectral response of three nanocomposites in the UV and visible spectrum.

FIGS. 5(a) and (b) show the spectral response of the 1-nm and 5-nm composites in the Infra Red spectrum, respectively. While the 1-nm particle composite has a response, seen in FIG. 5(a), that resembles that of the polymer dielectric, the 5 nm particle composite exhibits a series of well defined absorption resonances, as shown in FIG. 5(b). This is significant for potential sensor applications. The 10 nm nanocomposite was evaluated for its dielectric constant and dissipation factor as a function of frequency in the 100-450 MHz range. The dielectric constant k was found to increase as a function of frequency from about k=500 at 100 MHz to k=5000 at 450 MHz while the dissipation factor was approximately 0.1 for most of the frequency range.

Example 3

The same drum of Example 1 was rotated at a surface speed of 500 ft/min and the monomer vapor was set to form polymer layers 10-nm thick. A polyester film substrate was mounted on the drum with both metallized and clear areas to allow electrical and optical measurements, respectively. The silver vapor was evaporated at a fixed rate as in Example 1 through three different masks that allowed the formation of three different sizes of silver nanocrystals. Therefore, four different zones were provided on the polyester film for evaluation, as in Example 2. One zone produced polymer only, while the other three zones produced nanocomposites with silver nanoparticles of three different diameters, approximately 1 nm, 5 nm and 10 nm. The total number of deposited layers was 260.

Figure 6:
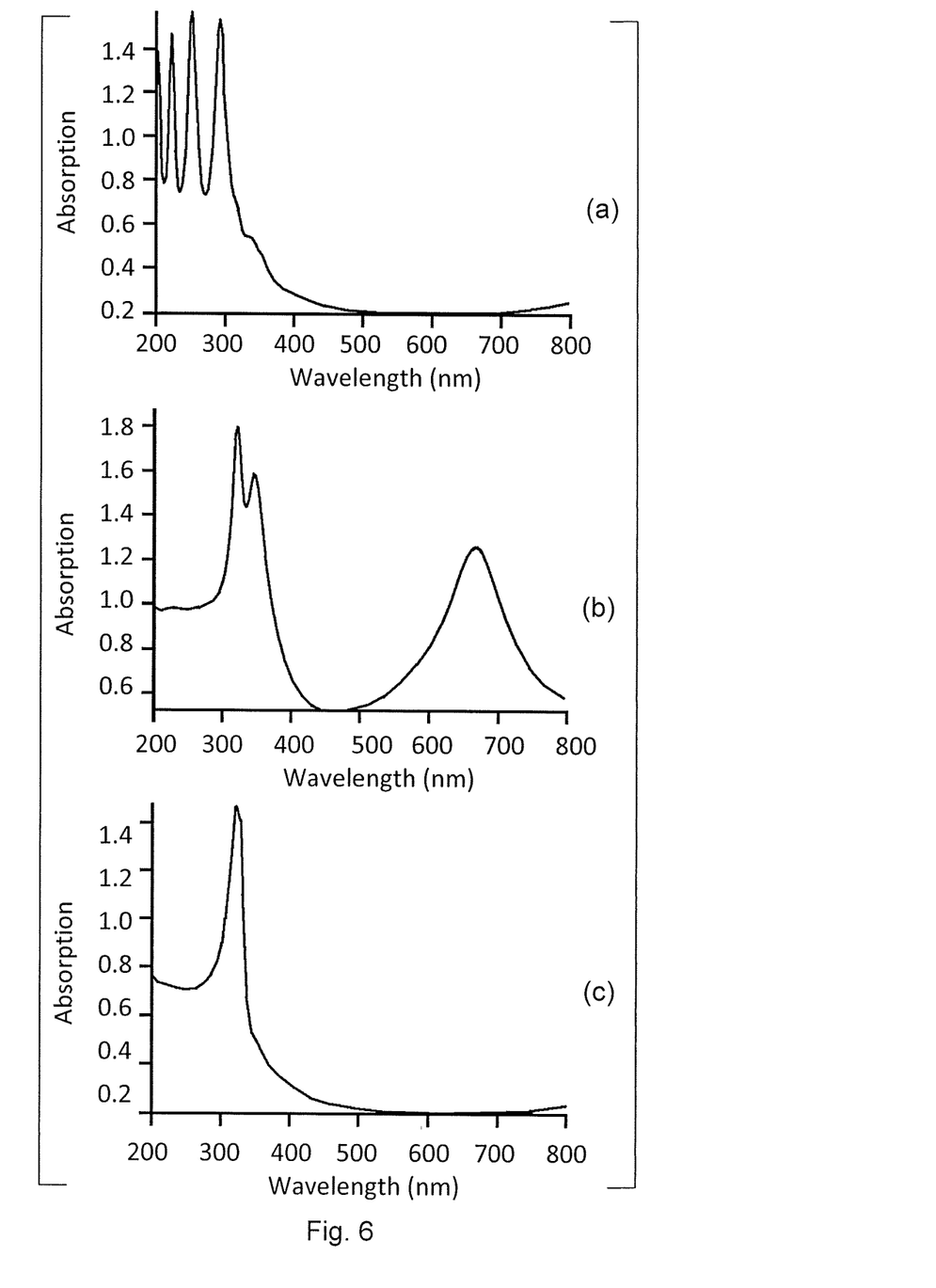
FIG. 6 illustrates the Infra Red spectral response of two different self-supported nanocomposites composed of 10,000 pairs of polymer/silver-nanoparticle layers.

FIG. 6 shows the UV spectral response of the three nanostructured composites produced in this example. One can clearly see in FIG. 6(a) that the smallest 1-nm diameter nanoparticles exhibit strong and well defined plasmon-induced absorption resonances in the UV part of the spectrum. FIG. 6(b) shows that the 5-nm particle composite has an absorption resonance in the middle of the visible spectrum and 10-nm particle composite shown in FIG. 6(c) exhibits a strong absorption peak near the UV spectrum, which is recognized as typical of silver nanoparticles of this size. This indicates a potential for applications as a biosensor for DNA analysis.

Example 4

The same drum was rotated at a surface speed of 500 ft/min with the monomer vapor set to form polymer layers 14-nm thick. A polyester film substrate with both metallized and clear areas was again mounted on the drum to allow for electrical and optical measurements. The silver vapor was evaporated at a fixed rate, as in the other examples, through two different masks that allowed the formation of two multi-layer structures with different size silver nanocrystals (1 nm and 10 nm). The total number of layers was 180. The dielectric constant of the polymer was $k_p=5.5$; the dielectric constant of the structure with the small nanoparticles was $k_{s1}=5.2$; and the dielectric constant of the structure with the larger particles was $k_{s2}=7.4$. Such low values of dielectric constant were not expected considering the total number of silver nanoparticle layers. A reasonable explanation, especially for the $k_{s1}=5.2$ nanocomposite, may be that this particular 3D matrix of silver nanoparticles may have produced a meta-material. This was confirmed by a measurement of the refractive index of the two materials, which showed the refractive index for the nanocomposite to be only 10% less than the refractive index of the pure polymer.

So-called meta-materials are not readily available in nature. Recent studies have shown that changes at the nanometer level, such as inclusions of nanoparticles, nanoholes, quantum dots, etc, can affect the macroscopic properties of materials, such as refractive index, dielectric constant, temperature coefficient, acoustic properties, and others. This invention illustrates that a structured and uniform matrix of 2D arrays of nanoparticles separated by polymer spacer layers can lead to the production of plasmon based meta-materials. Furthermore, additional effects on the material properties may be obtained by periodically varying the polymer spacer layers and/or the size of the nanoparticles.

The foregoing shows that the composite structure of the invention can be manipulated in its dimensions and layers structure to tailor it to meet the requirements of particular applications. As mentioned, the thickness of successive dielectric layers (as well as the thickness and particle density of the nanoparticle layers) may be varied in a single structure to obtain desired optical and electrical characteristics, including non-linear frequency-dependent effects. As such, the invention enables the manufacture of tunable nano-dielectrics. (A "tunable" material is normally understood in the art to mean a material where optical end electrical properties can vary with frequency)

As one skilled in the art will readily appreciate, the design of nanocomposite materials according to the invention with particular dielectric and optical properties involves the selection of appropriate polymer dielectric and nanoparticles. Preferred polymerizable compounds are radiation curable organic monomers. A large variety of polymerizable compounds can be used either as single monomers or in a formulation of one or more components. These include:

1. Acrylated compounds with various degrees of functionality, e.g. monoacrylates, diacrylates, tri and tetra acrylates. For example, a diacrylate monomer may have the following composition Where R is a functional chemical group such as aliphatic, cyclo-aliphatic, aromatic, and it may be a pure hydrocarbon, halogenated, metalated, etc.

2. Unsaturated alcohols such as allyl, methallyl, crotyl, 1-chloroallyl, 2-chloroallyl, cinnamyl, vinyl, methylvinyl, 1-phenallyl and butenyl alcohols; and esters of such alcohols with (i) saturated acids such as acetic, propionic, butyric, valeric, caproic and stearic, (ii) unsaturated acids such as acrylic, alpha-substituted acrylic (including alkylacrylic, e.g., methacrylic, ethylacrylic, propylacrylic, and the like, and arylacrylic such as phenylacrylic), crotonic, oleic, linoleic and linolenic; (iii) polybasic acids such as oxalic, malonic, succinic, glutaric, adipic, pimelic, suberic, azelaic and sebacic; (iv) unsaturated polybasic acids such as maleic, fumaric, citraconic, mesaconic, itaconic, methylenemalonic, acetylenedicarboxylic and aconitic; and (v) aromatic acids, e.g., benzoic, phenylacetic, phthalic, terephthalic and benzoylphthalic acids.

3. Unsaturated acids and esters with lower saturated alcohols, such as methyl, ethyl, propyl, isopropyl, butyl, isobutyl, sec-butyl, tert-butyl, 2-ethylhexyl and cyclohexyl alcohols, and with saturated lower polyhydric alcohols such as ethylene glycol, propylene glycol, tetramethylene glycol, neopentyl glycol and trimethylolpropane.

4. Unsaturated lower polyhydric alcohols, e.g., butenediol, and esters thereof with saturated and unsaturated aliphatic and aromatic, monobasic and polybasic acids, examples of which appear above.

5. Esters of the above-described unsaturated acids, especially acrylic and methacrylic acids, with higher molecular weight monohydroxy and polyhydroxy materials such as decyl alcohol, isodecyl alcohol, oleyl alcohol, stearyl alcohol, epoxy resins and polybutadiene-derived polyols.

6. Vinyl cyclic compounds including styrene, o-, m-, p-chlorostyrenes, bromostyrenes, fluorostyrenes, methylstyrenes, ethylstyrenes and cyanostyrenes; di-, tri-, and tetra-chlorostyrenes, bromostyrenes, fluorostyrenes, methylstyrenes, ethylstyrenes, cyanostyrenes; vinylnapthalene, vinylcyclohexane, divinylbenzene, trivinylbenzene, allylbenzene, and heterocycles such as vinylfuran, vinylpridine, vinylbenzofuran, N-vinylcarbazole, N-vinylpyrrolidone and N-vinyloxazolidone.

7. Unsaturated ethers such as methyl vinyl ether, ethyl vinyl ether, cyclohexyl vinyl ether, octyl vinyl ether, diallyl ether, ethyl methallyl ether and allyl ethyl ether.

8. Unsaturated ketones, e.g., methyl vinyl ketone and ethyl vinyl ketone.

9. Unsaturated amides, such as acrylamide, methacrylamide, N-methylacrylamide, N-phenylacrylamide, N-allylacrylamide, N-methylolacrylamide, N-allylcaprolatam, diacetone acrylamide, hydroxymetholated diacetone acrylamide and 2-acrylamido-2-methylpropanesulfonic acid.

10. Unsaturated aliphatic hydrocarbons; for instance, ethylene, propylene, butenes, butadiene, isoprene, 2-chlorobutadiene and alpha-olefins in general.

11. Unsaturated alkyl halides, e.g., vinyl fluoride, vinyl chloride, vinyl bromide, vinylidene chloride, vinylidene bromide, allyl chloride and allyl bromide.

12. Unsaturated acid anhydrides, e.g., maleic, citraconic, itaconic, cis-4-cyclohexene-1,2-dicarboxylic and bicyclo (2.2.1)-5-heptene-2,3-dicarboxylic anhydrides.

13. Unsaturated acid halides such as cinnamyl acrylyl, methacrylyl, crotonyl, oleyl and fumaryl chlorides or bromides.

14. Unsaturated nitriles, e.g., acrylonitrile, methacrylonitrile and other substituted acrylonitriles.

Nanoparticle materials in the nanocomposite may include:
1. Metalic nanoparticles composed of single metals such as gold, silver, platinum, tin, indium, copper, nickel, chromium, cobalt, aluminum, zinc, iron, tangsten, titanium, and tantalum.
2. Metal-alloy nanoparticles that may include one or more metals from the list above.
3. Metal-oxide nanoparticles such as aluminum oxide, copper oxides, zinc oxide, tantalum oxide, cobalt oxide tin oxide.
4. Metal-carbide nanoparticles such as silicon carbide, aluminum carbide, titanium carbide, nickel carbide.
5. Semiconducting nanoparticles, also known as quantum dots, such as doped silicon, gallium arsenide, zinc sulfide, cadmium selenide, cadmium sulfide, germanium, boron nitride, aluminum nitride.
6. Ferroelectric materials such as barium titanate, strontium titanate, lead zirconate titanate, lithium niobate, lead titanate Layers and/or stacks comprising different materials are also possible.

While the invention has been shown and described herein in what is believed to be the most practical and preferred embodiments, it is recognized that departures can be made therefrom within the scope of the invention. Therefore, it is not to be limited to the details disclosed herein but is to be accorded the full scope of the claims so as to embrace any and all equivalent processes and products.

We claim:

1. A multilayer nanocomposite structure produced in a vacuum environment comprising:
   a void-free layer of discrete nanoparticles embedded in a radiation-cured dielectric polymer; and
   a layer of said polymer deposited over the layer of discrete nanoparticles in a thickness greater than an average diameter of the nanoparticles so as to provide a substantially level polymer spacer film above the layer of discrete nanoparticles, said layers of discrete nanoparticles and polymer constituting a dielectric structure;
   wherein said dielectric structure is repeated to form a multilayer stack incorporating at least ten polymer layers per micron of thickness and containing a three-dimensional lattice of nanoparticles.

2. The structure of claim 1, wherein said multilayer nanocomposite structure is formed over a substrate coated with a release layer that enables a removal of the structure from the substrate.

3. The structure of claim 1, wherein said polymer layer has a thickness between 1 and 20 times said average diameter of the nanoparticles.

4. The structure of claim 1, wherein said nanoparticles include a conducting material.

5. The structure of claim 1, wherein said nanoparticles include a semiconducting material.

6. The structure of claim 1, wherein said nanoparticles include an insulating material.

7. The structure of claim 1, wherein said structure has a dielectric constant higher than that of the polymer.

8. The structure of claim 1, wherein said structure has a dielectric constant and a refractive index lower than those of the polymer.

9. A capacitor comprising the structure of claim 1.

10. An optical meta-material comprising the structure of claim 1 and characterized by an absorption curve that includes plasmon-resonance defined absorption peaks.

11. The structure of claim 1, wherein said multilayer nanocomposite structure is formed directly on a substrate or on a polymer layer overcoating the substrate, the void-free layer including a two-dimensional matrix of the discrete nanoparticles.

12. The structure of claim 11, wherein said substrate is flexible.

13. The structure of claim 1, wherein the void-free layer of discrete nanoparticles includes a void-free layer of discrete nanoparticles embedded in a radiation cured dielectric polymer deposited in a vacuum environment.

14. The structure of claim 13, wherein the layer of said polymer deposited over the layer of discrete nanoparticles includes a layer of said polymer deposited in a vacuum environment.

15. A multilayer nanocomposite structure comprising:
   first and second dielectric stacks, each dielectric stack including
      a corresponding layer of discrete nanoparticles occluded by a radiation-cured dielectric polymer deposited in a vacuum environment thereby producing a void-free polymer layer that contains a spatially uniform two-dimensional array of said nanoparticles; and
      a corresponding layer of said dielectric polymer disposed over said void-free polymer layer in a thickness greater than an average diameter of the nanoparticles to ensure a substantially level polymer spacer film above said void-free polymer layer,
   said second dielectric stack being formed over the first dielectric stack,
   said nanocomposite structure incorporating a plurality of said first dielectric stacks and a plurality of said second dielectric stacks to define at least ten polymer layers per micron of thickness of the nanocomposite structure,
   wherein the nanocomposite structure includes a three-dimensional lattice of nanoparticles to define a structure having plasmon-resonance based absorption characteristics.

16. The structure of claim 15, wherein said nanocomposite structure has a dielectric constant higher than that of the polymer.

17. The structure of claim 15, wherein said structure has a dielectric constant and a refractive index lower than those of the polymer.

18. A capacitor comprising the structure of claim 15.

19. An article of manufacture comprising a substrate and the structure of claim 15 disposed over the substrate.

20. An article of manufacture according to claim 19, further comprising a release layer between the substrate and the nanocomposite structure, the release layer enabling a removal of the structure from the substrate.

* * * * *